United States Patent
Kendall et al.

(10) Patent No.: US 8,838,672 B2
(45) Date of Patent: Sep. 16, 2014

(54) BROWSER WITH SETTING SAVING FEATURE

(75) Inventors: Scott Allan Kendall, Westfield, IN (US); Wanda Green Thompson, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 2644 days.

(21) Appl. No.: 10/510,057

(22) PCT Filed: Apr. 2, 2003

(86) PCT No.: PCT/US03/10057
§ 371 (c)(1), (2), (4) Date: Oct. 4, 2004

(87) PCT Pub. No.: WO03/088083
PCT Pub. Date: Oct. 23, 2003

(65) Prior Publication Data
US 2005/0193053 A1    Sep. 1, 2005

(51) Int. Cl.
*G06F 15/16* (2006.01)

(52) U.S. Cl.
USPC ........... 709/203; 709/201; 709/202; 709/204; 709/205; 709/206; 709/207; 709/217; 709/218; 709/219; 709/227; 709/228; 709/229

(58) Field of Classification Search
USPC ................. 709/217–219, 204–207, 227–229; 715/238, 788
See application file for complete search history.

(56) References Cited

U.S. PATENT DOCUMENTS

| | | | | |
|---|---|---|---|---|
| 5,873,109 A | * | 2/1999 | High | 715/243 |
| 5,885,016 A | | 3/1999 | Toyosaway et al. | |
| 6,108,712 A | * | 8/2000 | Hayes, Jr. | 709/246 |
| 6,133,916 A | * | 10/2000 | Bukszar et al. | 715/744 |
| 6,278,465 B1 | * | 8/2001 | Nielsen | 345/472 |
| 6,330,577 B1 | * | 12/2001 | Kim | 715/210 |
| 6,424,423 B1 | | 7/2002 | Hosokawa et al. | |
| 6,456,305 B1 | * | 9/2002 | Qureshi et al. | 715/800 |
| 6,457,030 B1 | | 9/2002 | Adams et al. | |

(Continued)

FOREIGN PATENT DOCUMENTS

| | | |
|---|---|---|
| EP | 811939 | 12/1997 |
| EP | 944009 | 9/1999 |

(Continued)

OTHER PUBLICATIONS

T. Bickmore et al. "Web Page Filtering and Re-Authoring for Mobile Users", Computer Journal, Oxford University Press, Surrey, GB, vol. 42, No. 6, 1999, pp. 534-546.

(Continued)

*Primary Examiner* — Emmanuel L Moise
*Assistant Examiner* — Edward Kim
(74) *Attorney, Agent, or Firm* — Robert D. Shedd; Reitseng Lin

(57) ABSTRACT

A web browser is configured to store format preferences associated with favorite and historical URLs so that upon receiving a request for such a URL, a web page is fetched and displayed with the associated stored format preferences. The invention is especially useful with displays of less than optimum resolution such as television screens, cell phones, and personal data assistants where a user may have different preferred formats for different web sites.

17 Claims, 4 Drawing Sheets

(56) References Cited

U.S. PATENT DOCUMENTS

| | | | |
|---|---|---|---|
| 6,510,458 B1* | 1/2003 | Berstis et al. | 709/219 |
| 6,636,861 B1* | 10/2003 | Stack | 1/1 |
| 6,665,842 B2* | 12/2003 | Nielsen | 715/269 |
| 6,810,410 B1* | 10/2004 | Durham | 709/203 |
| 6,853,390 B1* | 2/2005 | Wandersleben et al. | 715/802 |
| 6,980,213 B1 | 12/2005 | Hirose et al. | |
| 6,986,030 B2* | 1/2006 | Shmueli et al. | 713/1 |
| 7,003,558 B2* | 2/2006 | Agrusa et al. | 709/223 |
| 7,149,982 B1* | 12/2006 | Duperrouzel et al. | 715/788 |
| 7,177,915 B2* | 2/2007 | Kopchik | 709/217 |
| 7,320,109 B1* | 1/2008 | Zeevi et al. | 715/763 |
| 7,321,917 B2* | 1/2008 | Durham | 709/203 |
| 7,356,570 B1* | 4/2008 | Tuli | 709/217 |
| 2001/0029527 A1* | 10/2001 | Goshen | 709/218 |
| 2002/0010723 A1* | 1/2002 | Nielsen | 707/529 |
| 2002/0052917 A1* | 5/2002 | Ihara et al. | 709/203 |
| 2002/0085579 A1* | 7/2002 | Sullivan et al. | 370/428 |
| 2004/0015566 A1* | 1/2004 | Anderson et al. | 709/219 |

FOREIGN PATENT DOCUMENTS

| | | |
|---|---|---|
| EP | 1 052 839 A2 | 11/2000 |
| EP | 1100022 | 5/2001 |
| JP | 10-51704 | 2/1998 |
| JP | 11-306117 | 11/1999 |
| JP | 2000 222276 | 8/2000 |
| JP | 2001-28788 | 1/2001 |
| KR | 1999-017032 | 3/1999 |

OTHER PUBLICATIONS

Search Report Dated Aug. 1, 2003.

Kaminaga, H., "Troubleshooting tips for personal computers and Internet.pdf", Art 404, net trading, pp. 105-110.

Yamada, S., "The Latest Internet Browser Has Arrived: A Full Walkthrough of Explorer 4.0 Internet magazine", 1997, vol. 8, pp. 250-277.

* cited by examiner

BROWSER WITH SETTING SAVING FEATURE

CROSS-REFERENCE TO RELATED APPLICATIONS

This application claims the benefit, under 35 U.S.C. §365 of International Application PCT/US03/10057, filed Apr. 2, 2003, which was published in accordance with PCT Article 21(2) on Oct. 23, 2003 in English and which claims the benefit of Provisional Patent Application No. 60/370,522, filed Apr. 5, 2002.

TECHNICAL FIELD OF INVENTION

This invention relates to the field web browsers, and especially to web browsers used with displays having less resolution than computer monitors, for example television displays.

BACKGROUND ART

Systems which receive broadcast signals and generate a display signal for a television set are known as set-top boxes, whether they are actually on top of a television set or any other location outside or within the television set itself. Set-top boxes are currently available for receiving digital satellite television broadcast, cable television broadcast, community antenna service, dial up, cable, or DSL Internet service, or combinations thereof.

A set-top box formerly sold under the trademark WebTV and now sold as MSN TV viewer, and a set-top box made by Thomson and sold under the trademark DirecTV both have web browsers for receiving web pages over the internet and generating display signals causing the web pages to be displayed on television screens.

Conventional web browsers for use with conventional computer monitors have "favorites," "favorite places," and "bookmarks," functions that allow a user to save a page, identified in the memory as a URL, and also have "history" function that automatically saves recently accessed ("visited") web pages in the form of a URL in a register. The user can set the history function at different levels, depending on how much memory the user wishes to allocate to such function. Conventional web browsers also have a "text size" setting wherein a user can select from different text size options, for example smallest, small, normal, larger, larger, or largest text sizes, which function to increase or decrease the text size in a web page compared to the size included in the original web page design. In this example, smallest may correspond to 50% of the original size, small may correspond to 75%, normal to 100%, large to 125%, and largest to 150%. After the user changes the text size selection, all web pages visited will be displayed with the corresponding reduction or increase of text size versus the size designed into the page.

For web browsers generated by set-top boxes for viewing on television screens, the text size option and a graphics size option are usually presented so that the user can increase or decrease the graphics size versus the original design in the page. Other viewing options such as color may also be available in certain browsers.

Since television screens usually have lower resolution than computer monitors, and since the user is usually further from the television screen than from a computer monitor, it is more likely that a user using a web browser displayed on a television will select the increase text size and/or increase graphics size options to make some pages readable. For some pages, the user may have to increase the text size by 125%, and for other web pages, a different scaling ratio may be better.

Since there is no uniformity among web page designs and formats, a set-top box user may have to change text, graphics, and other options very frequently, sometimes for each viewed page. Although web browsers for television screens are generally user-friendly for changing these options because they are used so frequently, the constant readjustment of such options requires extra steps and extra time.

Very similar problems occur with other apparatus having display screens with lower resolution than computer monitors have, for example cell phones and personal data assistants.

Others have attempted to address the problem of text size on displays other than computer screens, for example a current web site, HTTP://www.DynaLab.com, offers Chinese, Japanese and Korean (CJK) Bitmap, TrueType, ATM, and Postscript fonts for Windows, Macintosh, Unix and Linux platforms which can be used on a variety of devices, from computers to cellular phones.

However, no one has solved the problem of the need to constantly readjust text, graphics, and other options for each viewed web page.

It is an object of the present invention to reduce the need to repeat adjustment of viewing options for web sites that are revisited.

DISCLOSURE OF INVENTION

This object, and others which will become apparent from the following disclosure and drawings, is addressed by the present invention which comprises in one aspect a system for processing requests for web pages comprising means to fetch a web page upon receipt of a URL request; means to receive format preferences for the fetched web page; means to store the received format preferences for the fetched web page in association with the corresponding URL; means to retrieve the format preferences upon receipt of a subsequent open request for the same URL and to deliver the corresponding web page with the format preferences. A preferred embodiment is a set-top box, which stores viewing option selections along with favorites or bookmark entries and with history entries.

In another aspect the invention comprises a method for communicating electronic information using a web browser comprising invoking the browser in a display device, accessing a web page, receiving any user preference settings for the web page, applying the preference settings to the web page, displaying the web page with the preference settings, storing the web page URL associated with the preference settings in a memory register, and upon the next accessing of the web page, retrieving and applying the associated preference settings to the web page.

Another aspect of the invention is a method of displaying a web page with user-preferred formatting for that web page comprising upon receipt of format selections for a displayed web page, storing the format selections in association with a URL for the displayed web page; upon receiving a next request for the same URL, retrieving the previously selected formats for the URL; and displaying the web page with the previously selected formats.

The web page address is stored as a favorite in a favorites register, or is stored as a previously viewed page in a history register, in each case with a cross reference to the last settings selected by the user.

The preferred types of settings are graphics and text, although color and other settings may be employed. All of the user selected view settings are stored in association with the URL in favorites, bookmarks, history, or any other memory register for previously viewed pages which makes access to the page faster.

Another aspect of the invention is any apparatus which has a web page generation function and a format preference selection function which stores user selected favorites and/or a log of previously viewed web pages in memory and which stores any user selected format preferences for the favorites and previously viewed pages, having capacity to store any format preference selections for each of them. If the user has not viewed a web page previously, the web page is displayed with default formatting. If the user selects a favorite from the favorites or bookmark list generated by the browser from a log of favorites which the user has not selected a format preference or changed a previously selected preference, the web page is displayed with default formatting. If the user has viewed a page recently enough that the URL is stored in a history log, the last set of selected preferences is stored and retrieved when the page is viewed.

In some cases, the default set of preferences may be different than the original information in the hypertext transfer protocol or other protocol of the page. For example, the web page may have been designed with 8-point font for certain text and 16 point font for other text. If the web browser has no upscaling or downscaling function activated, the web page is displayed with those font sizes. However, some web browsers have a user global change option. If a user has made a global change selection to double the text size, the new defaults may include a 200% text resealing function so that the 8-point font is displayed at 16 points and the 16-point at 32 points. In such a case, those 16 and 32 point fonts are displayed unless the user has selected text reduction or text enlargement for a specific page, in which case according to the invention the selected resizing scale for that particular URL is stored in a register for use when the web page is revisited by on that web browser.

The apparatus can be a set-top box either external to or a feature built into a television set, or it can be a hand held device with a web browser, or a cell phone, any other device which is capable of displaying a web browser. It is especially useful for devices that have display screens that have less resolution than the computer monitors for which web page designers have optimized their pages. Of course, it is most useful when the web browser has the capacity to store a log or register or other type memory of favorite web pages and/or a history of previously visited pages.

BRIEF DESCRIPTION OF DRAWINGS

To facilitate understanding, identical reference numerals have been used, where possible, to designate identical elements that are common to the figures.

MODES FOR CARRYING OUT THE INVENTION

Figure 1:
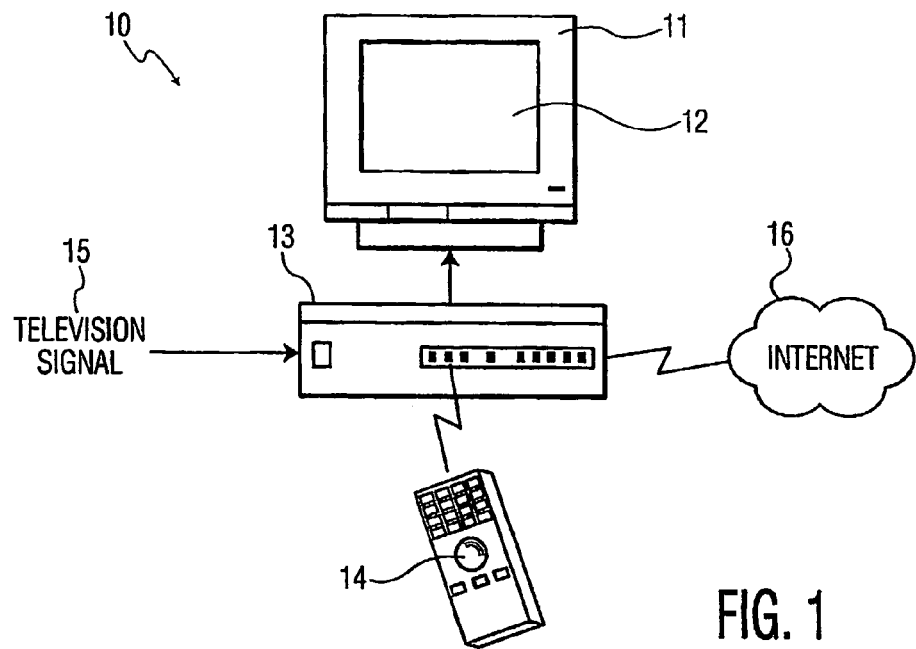
FIG. 1 is an exemplary television-based system with a set-top box with a web browser.

Referring first to FIG. 1, a system 10 comprising a television 11 having a display screen 12, and a set top box 13 and a remote controller 14 are illustrated. The television signal 15 and Internet connection 16 can be a single cable TV connection connected to a broadband source.

Figure 2:
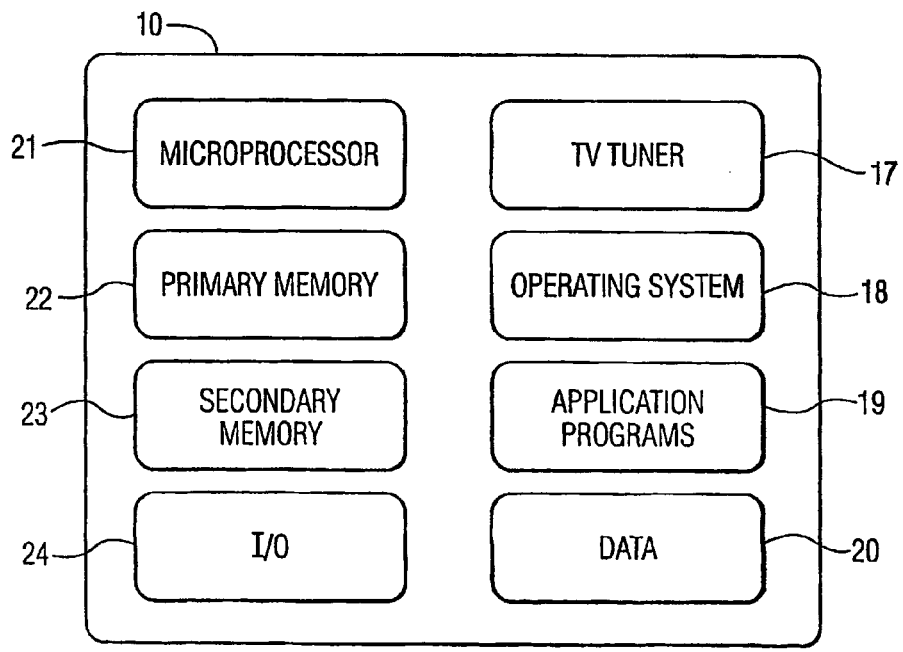
FIG. 2 is a block diagram of a generic system, which includes a television tuner, and some features of a set-top box, which can be programmed to function according to the invention.

FIG. 2 shows some components of a system, which comprises a TV tuner 17, an operating system 18, one or more application programs 19 such as a web browser program, and program data 20. The system includes a microprocessor 21, primary memory 22, secondary memory 23, and various I/O components 24. The secondary memory 23 may include hard disks, floppy disks, writable compact disk or DVD, or a programmable memory such as EEPROM (electrically erasable programmable read only memory). The I/O components can include the remote controller 14, a video/audio output, a network interface, a television signal input port, a satellite dish receiver, a cell phone antenna, for example. The system can be any at all which is used to generate web pages for a display, but is especially useful for use with displays having less resolution than computer screens generally have.

Figure 3:
FIG. 3 is an exemplary screen display of a web page generated at the URL http://www.cnn.com at a particular moment with default text and graphics sizing.

FIG. 3 is a web browser displayed on a television screen 12 (FIG. 1) where the URL address 26 of the web page 27 is http://www.cnn.com. The web browser is displaying the web page with default text 28 and default graphics 29 sizing. A text sizing icon 30 is displayed with a normal size icon 31 within it. A graphics sizing icon 32 is an icon of a magnifying glass with a normal graphics size icon 33 displayed within it. Icons 31 and 33 each include three lights represented by three circles on the top portions of icons 30 and 32, respectively. As discussed below, the state of the three lights indicates the setting of current sizing. Illustratively, when one or two lights are lit, and the corresponding button, for example icon 30, is pressed, one more light is lit. When all three lights are lit and the corresponding button is pressed, only one light will remain lit. In an alternative, the three lights may represent more than three states: all off, one on and the other two off (a total of 3 states depending on which light is on), two on and the other off (a total of 3 states), and all off. Each state can be assigned a different sizing. Other buttons include Back 34, Refresh 35, Home 136, Close 37, Shuffle Window 38, More 39, and To TV 40. A button 41 called Tools is used to hide or display the browser controls.

Figure 4:
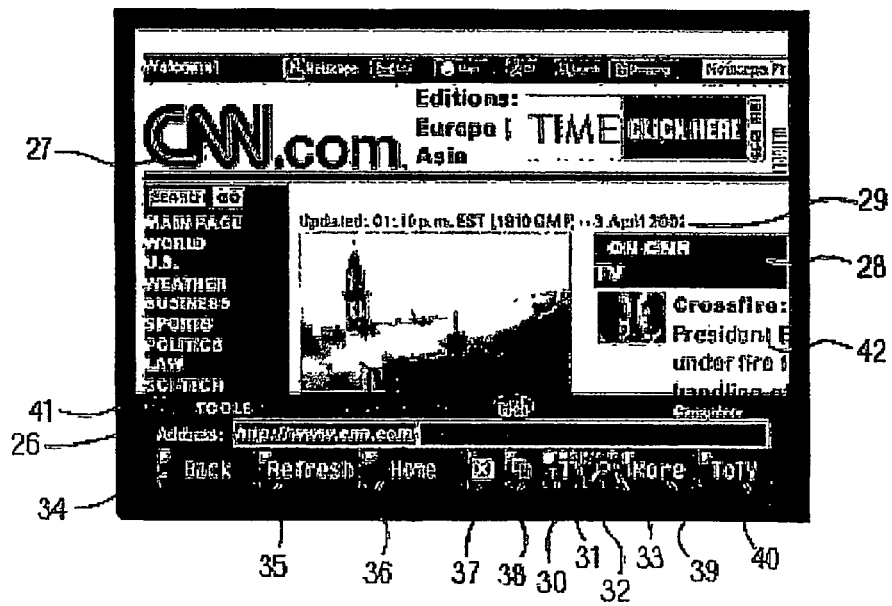
FIG. 4 is an exemplary screen display of the web page of FIG. 1, with 150% text magnification.

FIG. 4 is the same view as FIG. 3 except the text icon 30 has been toggled by the user so that text size icon 31 indicates that text size has been rescaled, and the text 42 is displayed in the browser at 150% of the text size 28 displayed in FIG. 3. When text is normal size, one light is lit, when text scaling is 125%, two lights are lit, and text scaling is 150%, all three lights in icon 31 are lit on the button 30. In FIG. 4, the text is more readable than in FIG. 3, but the user may find that the reformatting of the page to be worse than the small text. The caption "ON CNN TV" must wrap on the text magnified version, but does not wrap on the normal version. Various levels of magnification offer the user flexibility.

Figure 5:
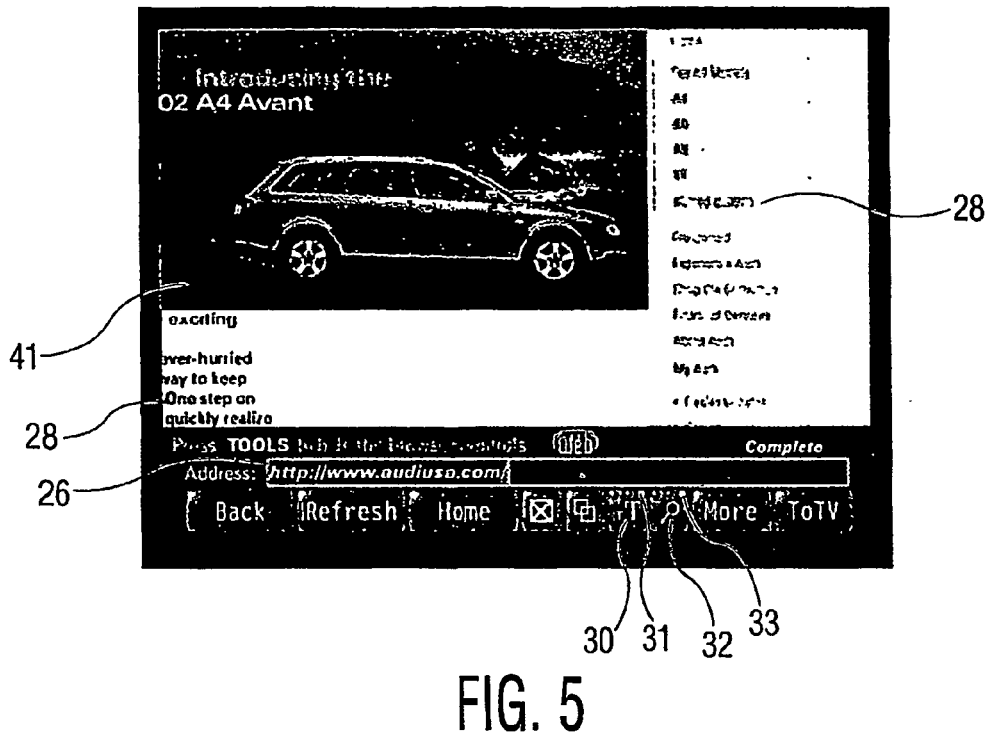
FIG. 5 is an exemplary screen display of a web page generated at the URL http://www.audiusa.com at a particular moment with default graphics magnification.

FIG. 5 is a web browser displayed in a television screen where the URL address 26 of the web page is http://www.audiusa.com, and the web browser is displaying the web page with default text size 28 and graphics 41 sizing. The text icon 30 has icon 31 indicating no increase or reduction, and the graphics icon 32 has icon 33 indicating no increase or reduction, i.e., one light is lit. In FIG. 5, certain text 28 is created using graphics, but is unreadable. Increasing the text size with button 30 would not increase the text size for such text 28, but in FIG. 6, the graphics has been toggled with button 32 to increase the graphics areas, including area indicated as 28 in FIG. 6, so that the graphical text 28 is now readable.

Figure 6:
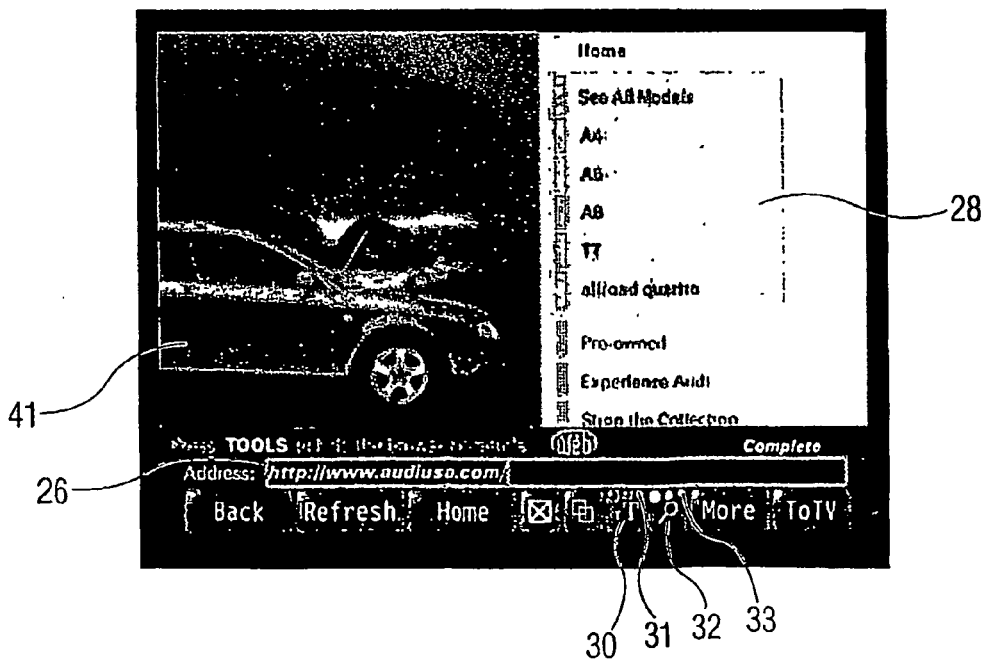
FIG. 6 is the web page of FIG. 3 with 150% overall magnification, including text and graphics.

While FIG. 3 compared to FIG. 4, and FIG. 5 compared to FIG. 6 show examples of two web pages and how the text and or graphics may be resized using web browser tools and icons, or pull down menus in other types and styles of web browsers, they do not illustrate the feature of our invention where the text and/or graphics settings for a particular page are stored so that upon revisiting a web site where text and/or graphics settings had to be adjusted by the user when the page was last viewed, the settings are automatically retrieved and applied to the page. Although these settings per URL may be stored in the primary memory such as RAM, it is preferable to store the settings in the secondary memory such as EEPROM, so that the settings can be retrieved after turning off and then on of the set-top box.

Actually, the user does not revisit a particular web page, but rather revisits a web site, which is identified by a URL. For example, the URL may be http://www.cnn.com, http://www.audiusa.com, or any of the millions of URLs registered by registration services. When the web site is chosen by the user by any method, for example by selecting a stored favorite from a favorites or bookmarks menu, by typing in a URL, or by clicking on link to the URL, the actual web page may be different than the previous visit to the web site. For news sites such as www.CNN.com, the web page may be changed many times a day. However, the text size and graphics sizing and other formatting features for a particular URL, i.e., web site, usually remain the same for long periods. It is that phenomenon which makes the present invention useful since the saved formatting preferences will usually adjust formats to preferred levels for a revisited URL, regardless of the changes to the web page content at a particular web page. In other words, the if the text size and graphics size on a web page at a particular web site are too small the first time it is accessed by a user, they will very likely be too small the next time that web site is accessed by that user.

Figure 7:
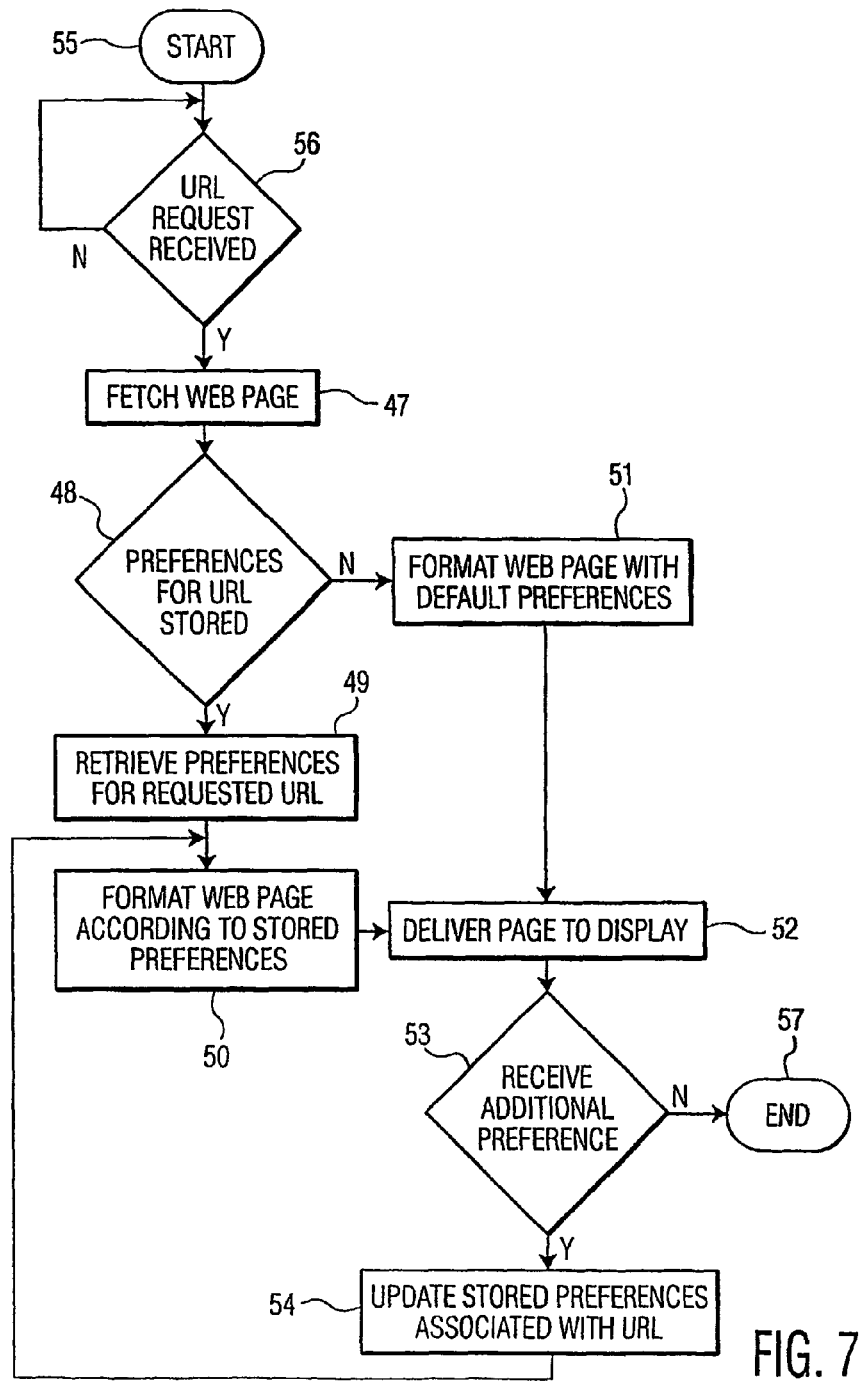
FIG. 7 is a flowchart illustrating preferred steps according to the invention.

FIG. 7 is a flow chart of a process, which starts at 55 with a URL request being received as determined at decision block 56 by the set-top box or other apparatus that runs the web browser software, which invokes a fetch 47 of the corresponding web page. The URL may be requested by clicking on a favorite or bookmark, clicking on a URL in another web page, by typing in a URL address, clicking on a hyperlink in an e-mail note, or in any other method known or which becomes known in the art.

If a format preference for that URL has been stored as determined at decision block 48, the URL-associated stored preference is retrieved at 49 and the fetched page is rendered at 50 with those stored preferences which, as mentioned above, can be text sizing, graphics sizing, or any of a number of other types of preferences, depending on the design of the web browser. If there are no stored preferences for the requested URL, the corresponding web page is fetched and rendered with defaults, which may be no resizing or may be a global resizing option which the user has selected for all pages. The rendered pages are displayed at 52. If new preferences such as text or graphics, for example, are received at 53, the preferences for that particular URL are updated and stored in memory 54. If no additional preference is received at this point, the process ends 54 and starts again at 55 when a new URL or the same URL is requested. Alternatively, the browser may update the preferences for an URL when a user has decided to leave the web site addressed by the URL, for example, by entering a new URL at the address box.

While this invention has been described in detail with respect to a particular mode of web browser and for two URLs, and for just text and graphics format features, and only with regard to televisions having web browsers, the invention has applicability to many other types of apparatus such as cell phones, personal data assistants, and many other types of systems which access web sites for display on viewing screens. It would also have applicability to many other URLs, other format options, other apparatus such as web sites which provide audio, video, photos, email, and other objects where, for example, sound level or video qualities may be adjusted by the user. Furthermore, the web pages may be retrieved from an intranet in a private http-based system rather than connected to the Internet. Many other alternatives, modifications, and improvements should be readily apparent to those skilled in this art without departing from the spirit and scope of the present invention.

The invention claimed is:

1. A method of communicating electronic information using a browser, the method comprising the steps of:
   invoking the browser in a display device;
   accessing a web page in response to a viewer specifying a URL in the browser;
   retrieving a viewer adjustable setting for the URL from a memory, the viewer adjustable setting comprising a text size and a graphics size for the web page;
   applying the retrieved viewer adjustable setting to the web page;
   providing a first icon on the display device, the first icon including a plurality of first elements that are simultaneously displayed and provide an indication of a current text size provided by the display device based on a number of the first elements currently illuminated, the first elements being switchable between at least three different display states that respectively indicate at least three different text sizes based on the number of the first elements currently illuminated, wherein the first elements are in one of the display states indicating the text size of the retrieved viewer adjustable setting;
   providing a second icon on the display device with the first icon, the second icon including a plurality of second elements that are simultaneously displayed and provide an indication of a current graphics size provided by the display device based on a number of the second elements currently illuminated, the second elements being switchable between at least three different display states that respectively indicate at least three different graphics sizes based on the number of the second elements currently illuminated, wherein the second elements are in one of the display states indicating the graphics size of the retrieved viewer adjustable setting;
   enabling a user to adjust the text and graphics sizes of the retrieved viewer adjustable setting by using the first and second icons, respectively;
   automatically saving a current state of the viewer adjustable setting in the memory in response to a signal for exiting the web page; and
   automatically applying the current state of the viewer adjustable setting to the web page a next time the web page is accessed.

2. The method of claim 1 wherein the web page is displayed on a display other than a computer monitor selected from a television screen, a cell phone, and a personal data assistant.

3. The method of claim 1 wherein the URL is specified in the browser by entering the URL in an address box field in the web browser, by clicking on a hyperlink, or by selecting a favorite or bookmark from a stored list.

4. A method of displaying a web page with a user-preferred format setting for the web page, the method comprising the steps of:

receiving a user input representing the user-preferred format setting for the web page while the web page is displayed via a display device, the user-preferred format setting comprising a text size and a graphics size for the web page;

displaying a first icon, the first icon including a plurality of first elements that are simultaneously displayed and provide an indication of a current text size provided by the display device based on a number of the first elements currently illuminated, the first elements being switchable between at least three different display states based on the number of the first elements currently illuminated that respectively indicate at least three different text sizes, wherein the first elements are in one of the display states indicating the text size of the received user-preferred format setting;

displaying a second icon with the first icon, the second icon including a plurality of second elements that are simultaneously displayed and provide an indication of a current graphics size provided by the display device based on a number of the second elements currently illuminated, the second elements being switchable between at least three different display states based on the number of the second elements currently illuminated that respectively indicate at least three different graphics sizes, wherein the second elements are in one of the display states indicating the graphics size of the received user-preferred format setting;

enabling a user to adjust the text and graphics sizes of the received user-preferred format setting by using the first and second icons, respectively;

automatically storing the user-preferred format setting in association with a URL for the web page in response to a signal for exiting the web page; and automatically applying the user-preferred format setting to the web page a next time the web page is accessed.

5. The method of claim 4 wherein the web page is displayed on a display other than a computer monitor selected from a television screen, a cell phone, and a personal data assistant.

6. The method of claim 4 wherein the web page is accessed the next time by a user clicking on a hyperlink in a different web page, by a user entering the URL for the web page in an address box on a web browser, or by a user selecting a favorite or bookmark from a stored list.

7. The method of claim 4 wherein the user-preferred format setting is stored in association with the URL for the web page in at least one of a history registry and a favorites registry.

8. The method of claim 4 wherein previously selected formats are stored in association with corresponding URLs in a history registry and/or with corresponding URLs in a favorites registry.

9. A system for processing requests for web pages, the system comprising:

means for fetching a web page upon receipt of a URL request;

means for receiving a user adjustable format preference for the web page, the user adjustable format preference comprising a text size and a graphics size for the web page;

means for providing a first icon on a display, the first icon including a plurality of first elements that are simultaneously displayed and provide an indication of a current text size provided by the display device based on a number of the first elements currently illuminated, the first elements being switchable between at least three different display states that respectively indicate at least three different text sizes based on the number of the first elements currently illuminated, wherein the first elements are in one of the display states indicating the text size of the received user adjustable format preference;

means for providing a second icon on the display with the first icon, the second icon including a plurality of second elements that are simultaneously displayed and provide an indication of a current graphics size provided by the display device based on a number of the second elements currently illuminated, the second elements being switchable between at least three different display states that respectively indicate at least three different graphics sizes based on the number of the second elements currently illuminated, wherein the second elements are in one of the display states indicating the graphics size of the received user adjustable format preference;

means for enabling a user to adjust the text and graphics sizes of the received user adjustable format preference by using the first and second icons, respectively;

means for automatically storing a current user adjustable format preference for the web page in response to a signal for exiting the web page; and means for automatically applying the current user adjustable format preference to the web page a next time the web page is fetched.

10. The system of claim 9 comprising a microprocessor, application program, storage, and I/O components.

11. The system of claim 9 wherein the display is at least one of a television screen, a cell phone display, and a personal data assistant display.

12. The system of claim 9 comprising means to deliver a web browser to the display, means to receive user selections, and means to format web pages according to stored user preferences associated with a corresponding URL.

13. A computer program embodied on a computer readable non-transitory medium for displaying a web page on a display device with user-preferred formatting for that web page, the computer program comprising:

a code segment for receiving user adjustable format selections for a displayed web page, the user adjustable format selections comprising a text size and a graphics size for the displayed web page, and for automatically storing a current user adjustable format selection in association with a URL for the displayed web page in response to a signal for exiting the displayed web page;

a code segment for enabling display of a first icon, the first icon including a plurality of first elements that are simultaneously displayed and provide an indication of a current text size provided by the display device based on a number of the first elements currently illuminated, the first elements being switchable between at least three different display states that respectively indicate at least three different text sizes based on the number of the first elements currently illuminated, wherein the first elements are in one of the display states indicating the text size of the received user adjustable format selections;

a code segment for enabling display of a second icon with the first icon, the second icon including a plurality of second elements that are simultaneously displayed and provide an indication of a current graphics size provided by the display device based on a number of the second elements currently illuminated, the second elements being switchable between at least three different display states that respectively indicate at least three different graphics sizes based on the number of the second elements currently illuminated, wherein the second elements are in one of the display states indicating the graphics size of the received user adjustable format selections;

a code segment for enabling a user to adjust the text and graphics sizes of the received user adjustable format selections by using the first and second icons, respectively;

a code segment for receiving a next request for the URL, and for automatically retrieving the current user adjustable format selection in response to the next request; and a code segment for automatically displaying the web page with the current user adjustable format selection in response to the next request.

14. The computer program of claim 13, wherein the code segment for receiving the user adjustable format selections stores the current user adjustable format selection in a primary memory.

15. The computer program of claim 13, wherein the code segment for receiving the user adjustable format selections stores the current user adjustable format selection in a secondary memory.

16. The computer program of claim 13, wherein the code segment for receiving the user adjustable format selections stores the current user adjustable format selection in association with the URL in a history registry and/or in a favorites registry.

17. The computer program of claim 13, wherein the code segment for receiving the next request for the URL receives the next request from a user clicking on a hyperlink in a different web page, entering the URL in an address box on a web browser, or selecting a favorite or bookmark from a stored list.

* * * * *